(12) United States Patent  
Goldberg et al.

(10) Patent No.: US 7,447,146 B2
(45) Date of Patent: Nov. 4, 2008

(54) METHOD AND APPARATUS FOR SUPPORTING MULTIPLE INDEPENDENT FAILURE DOMAINS

(75) Inventors: David N. Goldberg, San Jose, CA (US); Michael Traynor, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1012 days.

(21) Appl. No.: 10/028,298

(22) Filed: Dec. 19, 2001

(65) Prior Publication Data

US 2003/0115516 A1 Jun. 19, 2003

(51) Int. Cl.
G06F 11/00 (2006.01)
H04J 1/16 (2006.01)
H04L 1/00 (2006.01)
H04L 12/28 (2006.01)

(52) U.S. Cl. ............................. 370/216; 370/221; 714/2
(58) Field of Classification Search ......... 370/216–228, 370/221, 235, 241, 278, 282, 312, 428, 429; 714/2, 4, 5, 8, 9, 24, 42, 43, 44, 52
See application file for complete search history.

(56) References Cited

U.S. PATENT DOCUMENTS

| 5,357,517 | A | * | 10/1994 | Takebe | 714/704 |
| 5,410,536 | A | * | 4/1995 | Shah et al. | 370/216 |
| 6,233,702 | B1 | * | 5/2001 | Horst et al. | 714/48 |
| 6,594,785 | B1 | * | 7/2003 | Gilbertson et al. | 714/48 |
| 6,654,908 | B1 | * | 11/2003 | Lindsay et al. | 714/20 |
| 6,701,480 | B1 | * | 3/2004 | Karpuszka et al. | 714/764 |
| 6,742,146 | B2 | * | 5/2004 | Gross et al. | 714/702 |
| 6,760,838 | B2 | * | 7/2004 | Owen et al. | 713/1 |
| 6,766,467 | B1 | * | 7/2004 | Neal et al. | 714/5 |
| 6,892,321 | B2 | * | 5/2005 | Chen | 714/25 |
| 6,904,034 | B2 | * | 6/2005 | Kularatna et al. | 370/338 |
| 7,093,154 | B2 | * | 8/2006 | Bartfai et al. | 714/4 |
| 2002/0040449 | A1 | * | 4/2002 | Nakano | 714/6 |
| 2003/0018926 | A1 | * | 1/2003 | Chen | 714/4 |
| 2003/0101367 | A1 | * | 5/2003 | Bartfai et al. | 714/4 |
| 2004/0237022 | A1 | * | 11/2004 | Karpuszka et al. | 714/764 |

* cited by examiner

Primary Examiner—Edan Orgad
Assistant Examiner—Chuong T Ho

(57) ABSTRACT

A method of error protection. In one embodiment, the method of error protection consists of detecting an error during communication between nodes in a network. The nodes are separated by a link in the network. Further communication between the nodes is blocked in response to the detected error. The blocked communication is then unblocked, provided the communicating nodes have resolved the detected error. The unblocking of communication re-enables communication between the nodes.

21 Claims, 6 Drawing Sheets

359

359

392

650

METHOD AND APPARATUS FOR SUPPORTING MULTIPLE INDEPENDENT FAILURE DOMAINS

TECHNICAL FIELD

The present invention relates to protecting multiple domains from error infiltration. More particularly, the present invention provides error protection to networked electronic devices.

BACKGROUND ART

There are numerous communication means and protocols by which data is transmitted from one communicatively linked computer system to another. There are also innumerable problems that can occur during the transmission of the data within the link or network that can cause the data being received to contain errors. It is well known in the art that it is beneficial to contain that error to as small a portion of the network as possible as well as minimizing any collateral damage that may occur within the network.

Accordingly, there are accepted methods/protocols for communicating data that include provisions which may reduce or prevent problems associated with data errors that occur, commonly referred to as reliable protocols. There are also other accepted methods/protocols for communicating data that do not include provisions for minimizing data errors, commonly referred to as unreliable protocols.

One example of a reliable protocol for the communicating of data is to send each message, packet, or character redundantly until it can be reasonably assured that the data has been properly received. For example, a system can require that each message be transmitted three times in a row. The receiving computer system then compares the data in the received data packets, and when the data has been verified, the next data packet is processed. By redundant sending of the data, data errors are reduced.

However, redundant sendings of the same data have disadvantages associated therewith. For example, multiple sendings of the data message or packet places an additional load on the network, using valuable bandwidth and time to repeatedly send the same data. Further, an additional load is placed on both the sending and receiving computers, both in time needed to repeatedly communicate the same data, and in usable data storage space that is used to retain multiple copies of the same data. The combination of an additional load placed on the network and the associated computers effectively slows the network.

Another example of a reliable protocol for communicating data is TCP/IP (transmission control protocol/Internet protocol), commonly utilized in today's network environments. TCP, using a packet sequencing system, provides for intercommunication between the sending and receiving computer systems. The receiving computer system acknowledges proper delivery of each data packet to the sending computer system, before processing subsequent data. For example, if a packet(s) of data was not received or had been corrupted during transmission, the receiving computer system notifies the sending computer system that that particular packet/packets was/were not properly received, and the sending computer then re-sends that corrupted data packet, thus replacing the damaged or corrupted data.

By virtue of the sequencing of data packets and the intercommunication between sending and receiving computer systems, instances of erroneous data being communicated within the system may be reduced. However, TCP has disadvantages associated therewith. For example, because of the intercommunication, e.g., acknowledging signals, between the sending and receiving computer systems, communication using TCP takes longer to transmit than other communication protocols. Additionally, the acknowledging signals place an additional load on both the computer systems and the network in which the computer systems are communicating, while also reducing available bandwidth within the network.

An example of an unreliable protocol that is widely used in computer network systems to communicate data is UDP (user datagram protocol). It is appreciated that UDP does not provide for sequencing of data packets, nor does UDP provide for acknowledgment of arrival of data packets, as does TCP. UDP sends a data packet, assumes the data arrived at the receiving computer system, and continues sending data. Because UDP does not provide for sequencing and/or acknowledging of data packets, communications transmitted using UDP are substantially faster (relatively speaking) than those transmitted using TCP.

However, UDP has disadvantages associated therewith, For example, because of the lack of sequencing and/or acknowledgment signals between sending and receiving computer systems, data send using UDP is more susceptible to data errors. Further, networked computer systems that use UDP and other less-reliable communication protocols are therefore vulnerable to data errors and to the propagation of those data errors.

Regardless of the communication protocol/s used to transmit information, data errors do occur. What has not been addressed, in the above described unreliable communication protocols and which may be applicable to many other communication protocols not described, are the steps that should be taken subsequent to the detection of an error and how to prevent additional collateral damage within the network. Also not addressed in either reliable and/or unreliable protocols is the matter of how the computer systems communicating within the network acknowledge their being made aware of and their handling of the error to the network and the computers therein. This is especially important because many of the computer systems within the network may have different operating systems, and those different operating systems may have difficulty in intercommunication.

Thus, there exists a need for a method and apparatus that can guard computer systems against data errors and the propagation of those errors. A need further exists for a method that fulfills the above need, and which provides a method and apparatus to enable computer systems to notify the network that it is apprised of and has handled the error.

DISCLOSURE OF THE INVENTION

Embodiments of the present invention are drawn to providing a method and apparatus for providing error protection in a network environment.

In one embodiment, a method for error protection is comprised of detecting an error during communication between nodes in a network. The nodes are separated by a link in the network. In response to the detected error, further communications between the nodes is blocked. Once the nodes in the network have resolved the error, the communication block is removed. Removing the block re-enables communication between the nodes.

These and other objects and advantages of the present invention will no doubt become obvious to those of ordinary skill in the art after having read the following detailed description of the preferred embodiments which are illustrated in the various drawing figures.

BRIEF DESCRIPTION OF DRAWINGS

The accompanying drawings, which are incorporated in and form a part of this specification, illustrate embodiments of the invention and, together with the description, serve to explain the principles of the invention.

MODES FOR CARRYING OUT THE INVENTION

A method of supporting multiple protection domains is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention is discussed primarily in the context of a plurality of interconnected electronic devices. In one embodiment, the electronic devices can be multiple computer systems, e.g., computer system 650 of FIG. 6, that are communicatively coupled in a network environment. In another embodiment, the electronic devices can be electronic chips which may be disposed within a computer system, within another chip, within a system within a system of electronic devices, etc. In another embodiment, the electronic devices can be cell phones. In yet another embodiment, the electronic devices can be satellites. In still another embodiment, the electronic devices can be multiple processors. It is further appreciated that the present invention can be used with many other types of electronic devices that can have the capability to access and communicate with other electronic devices within a network, e.g., a system in a network, a system within a system in a network of systems, a network of computer systems, and so on. It is further appreciated that embodiments of the present invention may be practiced in nearly any network environment, e.g., an external network such as a LAN (local area network) or a MAN (metropolitan area network), and an internal network, e.g., a backplane computer system network, and the like.

Figure 1:
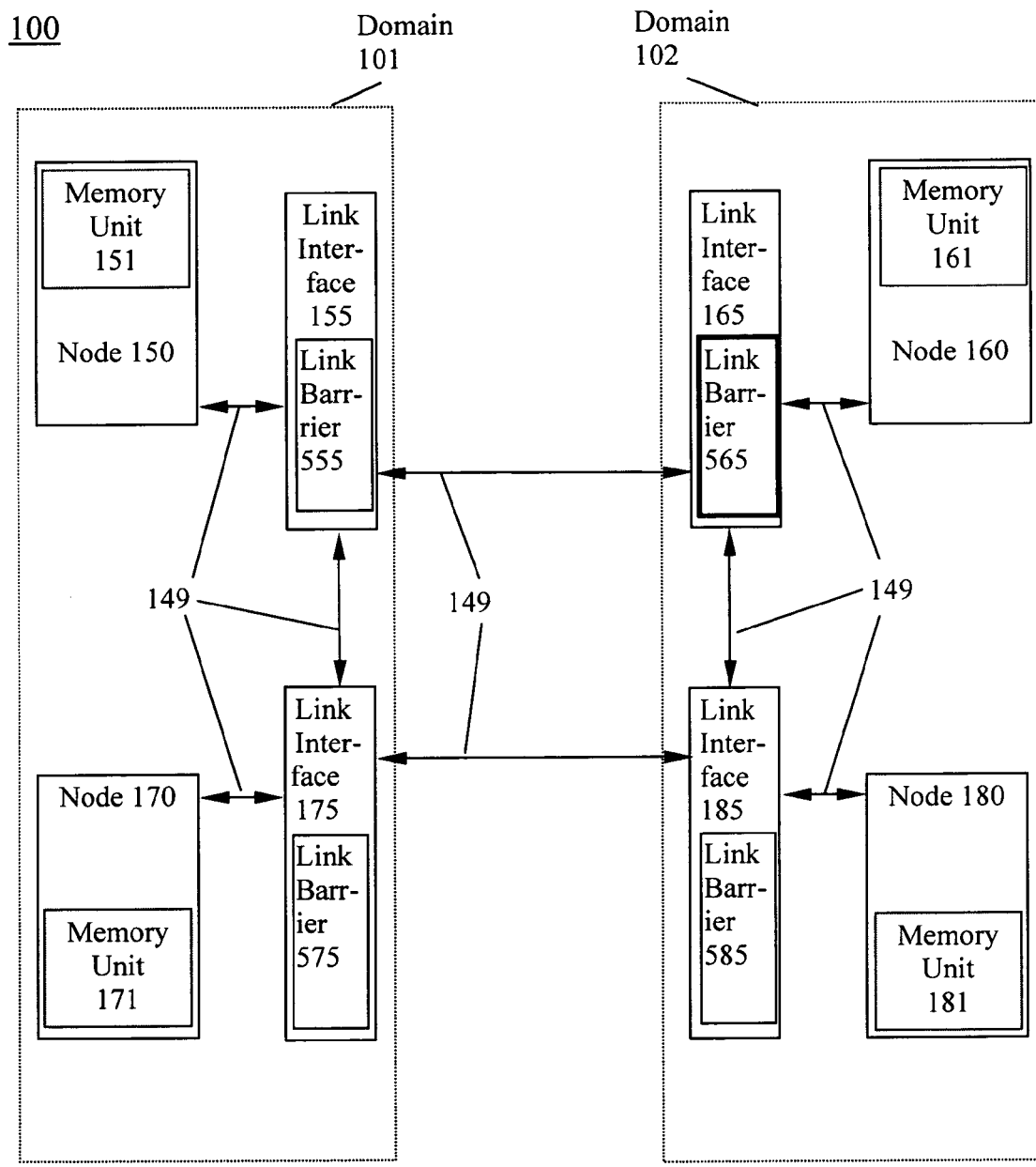
FIG. 1 is a block diagram of a network environment upon which embodiments of the present invention may be practiced, in accordance with one embodiment of the present invention.

FIG. 1 shows a network 100, a multi-stage network, which, in one embodiment, includes a domain 101 and a domain 102. A multi-stage network, such as network 100, provides multiple paths over which data can be bi-directionally transmitted.

Still referring to FIG. 1, domains 101 and 102 are communicatively coupled via a connection 149. Within domain 101, node 150 is communicatively coupled, via a connection 149, to link interface 155. Node 170 is communicatively coupled, via a connection 149, to link interface 175. Link interfaces 155 and 175 of domain 101 are communicatively coupled with each other via a connection 149.

Within domain 102 of FIG. 1, node 160 is communicatively coupled to link interface 165 via a connection 149. Node 180 is communicatively coupled to link interface 185 via a connection 149. Link interfaces 165 and 185 of domain 102 are communicatively coupled with each other via a connection 149.

Within network 100 of FIG. 1, link interfaces 155 and 175 of domain 101 are communicatively coupled via a connection 149 to link interfaces 165 and 185 of domain 102, in one embodiment of the present invention.

For data to be transmitted from node 150 to, for example, node 180, the data would be transmitted from node 150, to link interface 155, and then either to link interface 165, then link interface 185, and then to destination node 180, or to link interface 175, then link interface 185, and then to destination node 180. Alternatively, data that needed to sent from domain 102 to domain 101 could be transmitted in similar but reversed manner. In one embodiment, domain 101 and domain 102 can operate independently of one another, and may or may not have similar or compatible operating systems.

Also shown in FIG. 1 is link barrier 565, which, in one embodiment, is an integrated circuit chip which is integrated within a link interface, e.g., link interface 165. In one embodiment, link barrier 565 is an ASIC (application specific integrated circuit) chip, such as a Sakura chip, developed by Hewlett-Packard Company of Cupertino, Calif. It is appreciated that for descriptive purposes of the functions and disposition of the link barrier, embodiments of the present invention will be described in the context of link barrier 565 as shown disposed within link interface 565. However, it is appreciated that to provide for proper protection within network 100, an analogous link barrier, e.g., link barrier 555, 575, and 585, respectively, are disposed in each of the other link interfaces, e.g., link interfaces 155, 175, and 185. When inactive, link barrier 565 is, in one embodiment, configured to allow data transmissions from one domain, e.g., domain 101, to another domain, e.g., domain 102. When activated, link barrier 565 is configured to block or prevent further data communication from one domain to another. Link barrier 565 is activated when data errors are observed/detected within a link interface, e.g., link interface 165.

A variety of techniques and processes have been developed to detect errors. One technique to detect errors is to monitor noise levels with specially designed circuitry. One process to detect errors is CRC (cyclic redundancy check). Another such process is LRC (longitudinal redundancy check). It is appreciated that a network, e.g., network 100, can simultaneously employ many different techniques and processes to provide error detection.

It is appreciated that in another embodiment, link barrier 565 may be implemented as a stand-alone link barrier implemented in a node, e.g., node 165, and not disposed within a link interface. It is further appreciated that in another embodiment, a link barrier, e.g., link barrier 565 can be implemented in nearly any configuration comprised of intercommunicating electronic devices. It is appreciated that link interfaces 155, 165, 175, and 185 can be ATM switches, smart hubs, routers, bridges, and the like.

In one embodiment, connection 149 is a hard-wired (physically coupled) connection, such as, but not limited to, an ethernet connection, a serial connection, a USB connection, a IEEE 1394 (Firewire) connection, an address/data bus connection, and other well known and acceptable connection protocols. In one embodiment, connection 149 is a wireless connection, which can include, but is not limited to, wireless radio, IR (infra-red), or Bluetooth wireless communication. It is appreciated that embodiments of the present invention are well suited to be implemented in nearly any wireless or hard-wired communication configuration. It is further appreciated that embodiments of the present invention are readily implementable in a network utilizing a combination of wireless and hard-wired configurations.

Figure 6:
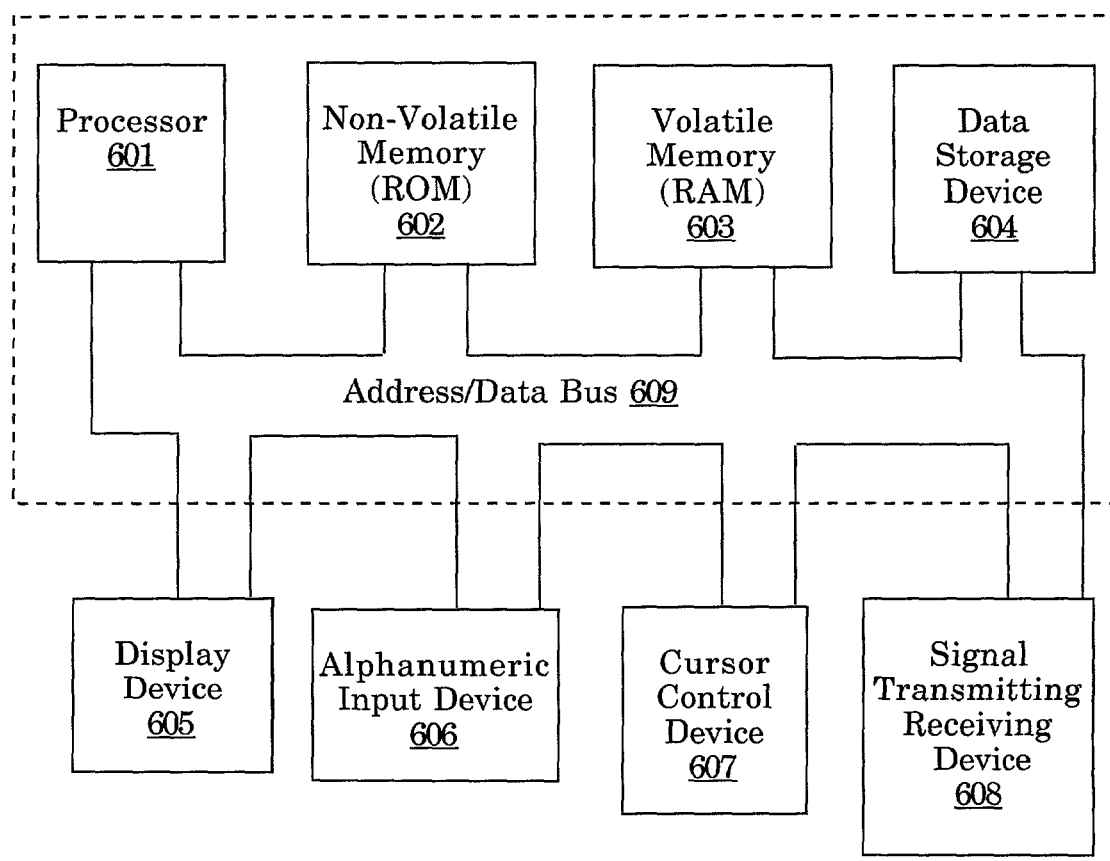
FIG. 6 is a block diagram of an exemplary computer system upon which embodiments of the present invention may be practiced.

It is appreciated that, in one embodiment, nodes 150, 160, 170, and 180 of FIG. 1 are representative of separate computer systems, e.g., computer system 650 of FIG. 6, communicatively coupled in a network. In another embodiment, nodes 150, 160, 170, and 180 are representative of sub-networks. In still another embodiment, nodes 150, 160, 170, and 180 are representative of intercommunicating electronic devices, e.g., chips within a system of chips. In yet another embodiment, nodes 150, 160, 170 and 180 are representative of multiple processors disposed within a backplane computer system network, where multiple networked processors are disposed on a single card, and multiple cards having multiple processors disposed thereon are coupled with the backplane. One example of a backplane computer system network is a SuperDome System, developed by and commercially available through Hewlett-Packard Company of Cupertino, Calif. In yet another embodiment, nodes 150-180 may represent a combination of networks, e.g., node 150 can represent an individual computer system coupled to a network, node 160 may represent multiple processors within a backplane, node 170 can represent a sub-network containing multiple individual computer systems coupled within the sub-network, and node 180 can represent a LAN network. It is appreciated that embodiments of the present invention are well suited for implementation in nearly any network configuration, or nearly any combination of intercommunicating electronic devices.

For illustrative purposes, the present invention is implemented in an internal network. Accordingly, in one embodiment, nodes 150-180 are cells within a backplane, where each node is representative of four processors disposed within each cell. Within nodes 150, 160, 170, and 180, there is a memory unit 151, 161, 171, and 181, respectively. In one embodiment, nodes 150-180 can address each node's memory and communicate with each other through their associated memory units 161-181.

Computer systems having internal networks, such as a SuperDome System, are commonly constructed of communicatively coupled multiple processors and multiple nodes integrated within a backplane. For example, there may be an internal computer system network that, in one embodiment, can have, but is not limited to, sixty-four processors that are partitioned into sixteen cells, which are then divided into protected domains, e.g., domains 101 and 102 of FIG. 1 and up to a domain 116, although domains 103 to 116 are not shown. Embodiments of the present invention provide support for multiple protection domains, which can span two or more cells/nodes separated by a link interface, e.g., link interfaces 155, 165, 175, 185 and link barrier 565 of FIG. 1, in a multiple node computer system/network. e.g., network 100 of FIG. 1.

Figure 2:
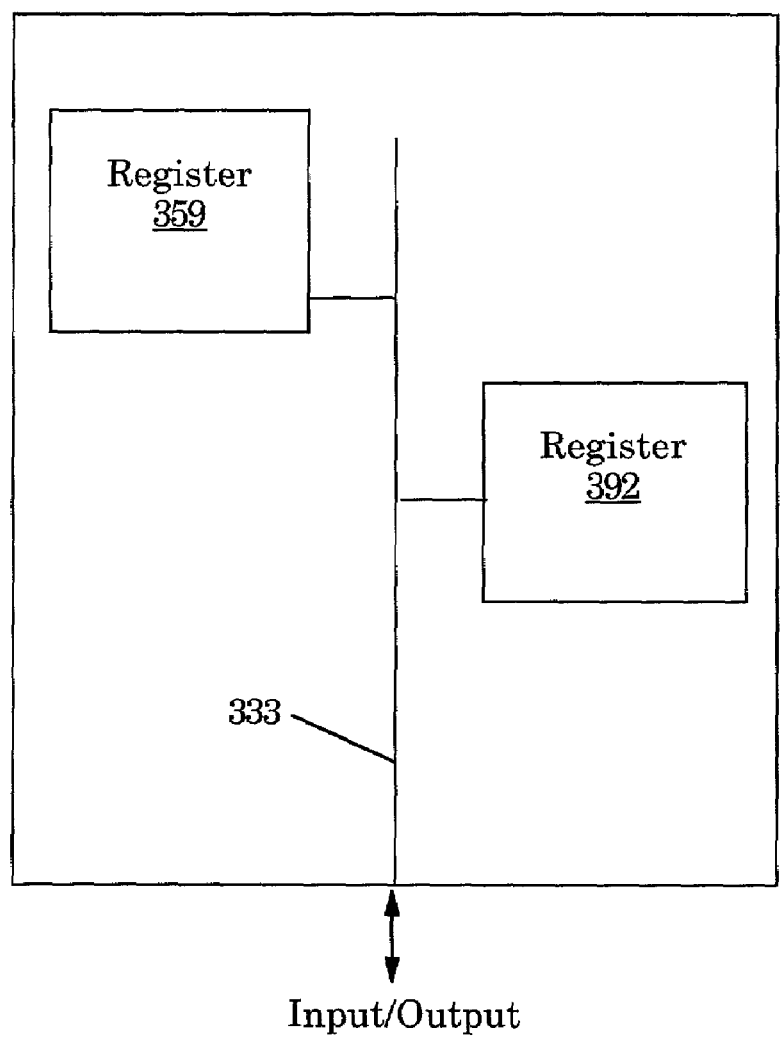
FIG. 2 is a block diagram of a link barrier upon which embodiments of the present invention may be practiced, in accordance with one embodiment of the present invention.

FIG. 2 is a block diagram of components and circuitry within an integrated circuit chip, e.g., link barrier 565 of FIG. 1, in accordance with embodiments of the present invention. Link barrier 565 provides for multiple cells/processors, e.g., nodes 150-180, to communicate/signal their usage of each link which connects two nodes in the system. e.g., node 150 and node 170. Included in link barrier 565 is an address/data bus 333 for communicating information and a register 359 coupled to bus 333 for storing link usage signals received from nodes within a network, e.g., network 100 of FIG. 1. In one embodiment, register 359 is a thirty-bit register. Also shown in link barrier 565 is an fatal error register 392, coupled to bus 333, for storing an error bit. Bus 333 is further coupled to an input/output connection for receiving and sending data.

It is appreciated that, in one embodiment, the instructions and/or logic for controlling a link barrier are stored in the node with which the link barrier is associated. For example, the software instructions/hardware logic for controlling link barrier 565 are stored in node 160 of FIG. 1. It is further appreciated that each node (nodes 150-180) has and can execute its own, and possibly non-analogous, implementation of the instructions/logic.

Figure 3A:
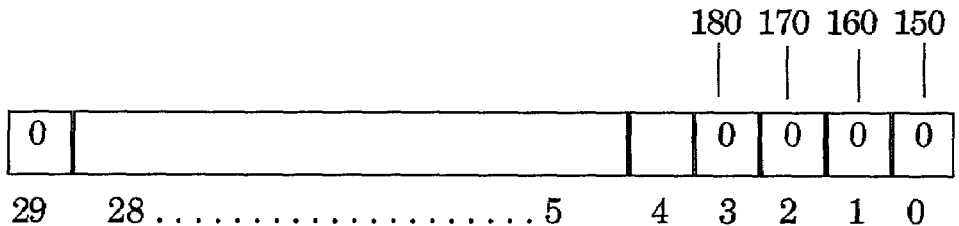
FIG. 3A is a block diagram of a status register, included in the link barrier of FIG. 2, and which is indicating no active nodes within the network environment of FIG. 1, in accordance with one embodiment of the present invention.

It is further appreciated that while one embodiment of the present invention describes utilization of specific registers to store information regarding link usage and error indications, in other embodiments, the information may be stored in nearly any memory storage device or storage element, e.g., stored as bits in RAM (random access memory) such as RAM 103 of FIG. 6, or stored as state encodings in registers or RAM, state encodings in a persistent storage device such as NVRAM (non-volatile RAM) or a disk (hard disk, floppy disk, CD, etc.), or stored as state encodings in a directory, and so on FIG. 3A is a block diagram of a storage element, e.g., register 359 of link barrier 565 which, in one embodiment, is referred to as LinkInUse register 359. In one embodiment, LinkInUse register 359 is a 30-bit register as opposed to a 16-bit register, which allows for future (larger than 16 bit) cell growth, since LinkInUse register 359 is implemented with a data mask. LinkInUse register 359 is used by link barrier 565 to indicate which cells are actively using links to which link barrier 565 is communicatively coupled. It is designed to be a one-hot indicator, with each bit of LinkInUse register 359 corresponding to a cell in its domain which is using the link provided by link barrier 565. The use of register 359 implemented in link barrier 565 allows for signaling sharing on a cell basis. This means that each cell or group of processors, e.g., nodes 150-180, owns a flag (bit position) in LinkInUse register 359, and therefore signals its usage of link barrier 565 by setting (or clearing) its flag. Embodiments of the present invention use LinkInUse register 359 under the control of associated software/firmware stored, in this example, in node 160, to indicate/communicate which other cells, e.g., nodes 150-180, are actively using or intend to use link barrier 565 to send data, commands, or status from processors or memory in one node to processors or memory in another node/cell.

Still referring to FIG. 3A, in one embodiment, LinkInUse register 359 bit 0 is associated with node 150, bit 1 is associated with node 160, bit 2 is associated with node 170, and bit 3 is associated with node 180. In another example, nodes 150-180 could be associated with bits 4-29, depending upon the number of nodes within the network in which link barrier 565 is implemented. In the example presented in FIG. 3A, none of the nodes are actively using or will be using link barrier 565, as indicated by each of the associated bits showing a zero, indicative of no activity.

Figure 3B:
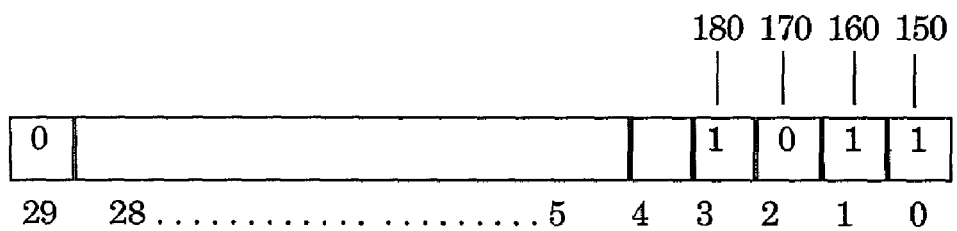
FIG. 3B is a block diagram of a status register, included in the link barrier of FIG. 2, and which is indicating active nodes within the network environment of FIG. 1, in accordance with one embodiment of the present invention.

Referring now to FIG. 3B, LinkInUse register 359 indicates that some of the cells/nodes in FIG. 1 are using or intend on using the links coupled with link barrier 565 to communicate data. For example, node 150 has indicated it will be communicating data, as shown by a "1" in bit position 0. Further, as indicated by a "1" in bit position 1 and in bit position 3, node 160 and node 180, respectively, will also be communicating data.

With reference to storage element LinkInUse register 359 in both FIGS. 3A and 3B, it is appreciated that multiple (or all) bits within LinkInUse register 359 may be set at any point in time. Further, LinkInUse register 359 is unique in that it is sticky, meaning that it retains its value, even when another cell/node sets its corresponding bit. Additionally, LinkInUse register 359 is unique in that a data mask is required in order to set or clear bits.

LinkInUse register 359, of FIGS. 3A and 3B, can be set or cleared via special CSR (control-status register) instructions/commands, but as noted above, requires an accompanying mask for the data. The data mask that accompanies the command should have "1"s in the bit positions corresponding to the bits in LinkInUse register 359 which are desired to have set or clear actions. Accordingly, the individual cells/protection domains can set/clear either their own flag in LinkInUse register 359 or they can set/clear all flags as a 30-bit word (or even set/clear flags for other cells/protection domains. It is appreciated that LinkInUse register 359 will be sticky, e.g., collect "1"s until explicitly cleared. LinkInUse register 359 is normally cleared during power-on conditions. It is noted that LinkInUse register 359 is not cleared during hardware re-initialization. It is appreciated that, in one embodiment, LinkInUse register 359 can support error-handling and recovery, and by the virtue of its non-zero status, controls or prevents the ability to clear an error status indicator bit in a different control/status register, e.g., fatal error register 392 of FIG. 4.

Figure 4:
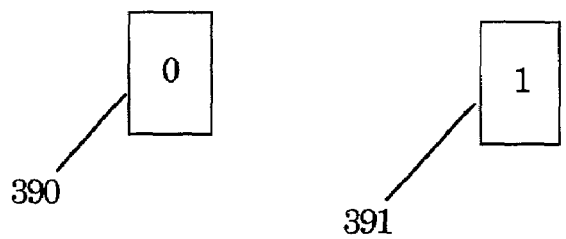
FIG. 4 is a block diagram of a error register disposed within the link barrier of FIG. 2, in accordance with one embodiment of the present invention.

FIG. 4 is a block diagram of a fatal error register 392, for, in one embodiment, indicating an error status within network 100 of FIG. 1. Fatal error register 392, in one embodiment, has two states, as indicated by error status indicator bit 390 and error status indicator bit 391. Bit 390 is indicative that no errors have been detected or observed within network 100, and is thusly represented by a zero. When fatal error register 392 is showing error status indicator bit 390, link barrier 565 remains in an inactive state, and as such, allows data communication between the domains, e.g., domains 101 and 102 of FIG. 1.

Figure 5:
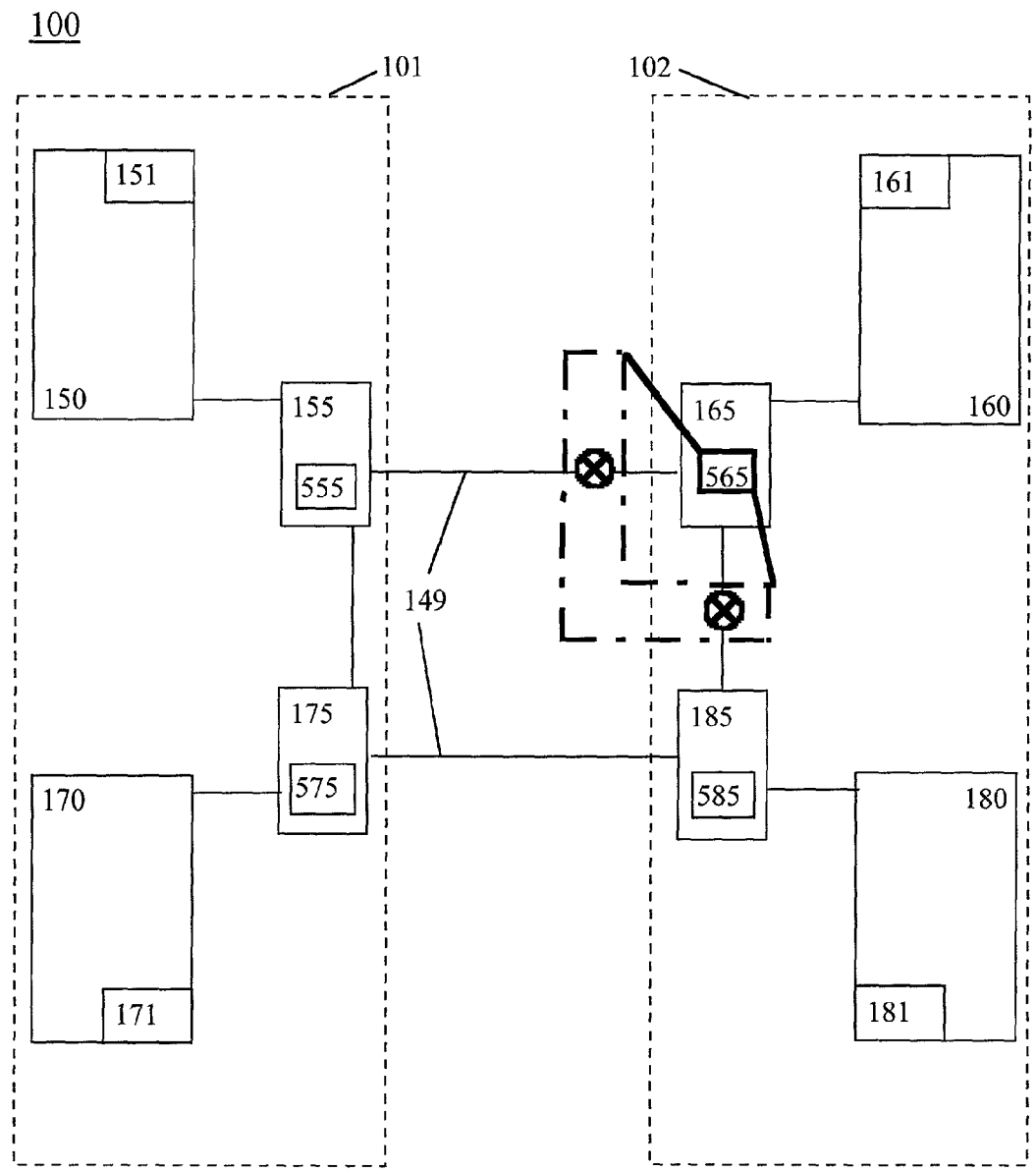
FIG. 5 is a block diagram of an activated link barrier implemented in the network environment of FIG. 1, in accordance with one embodiment of the present invention.

Still referring to FIG. 4, error status indicator bit 391 is indicative that an error has been observed or detected in network 100, and is thusly represented by a one. When fatal error register 392 is showing error status indicator bit 391, link barrier 565 is activated, and as such, does not allow data communication between domains, e.g., domains 101 and 102, as shown in FIG. 5.

Referring to FIGS. 3A, 3B and 4, when link barrier 565 is activated, communication between domains is blocked. Further, until such time as error status indicator bit is reset to 390, nodes in different domains are prevented from communicating with each other. By providing a means by which each node may reset its associated LinkInUse register 355 bit to zero, it is relatively easy for each of the blocked nodes to signal to link barrier 565 that it is aware of the data error, and has resolved the error in a manner individual to that node. For example, to resolve an error, one node may perform a re-boot. Another node may flush its cache, deleting the corrupted data. Another node may simply block access to the data that contains the error.

It is appreciated that although embodiments of the present invention are discussed in the context of data errors, link barrier 565 can, in other embodiments, perform other functions to reduce potential network problems. For example, link barrier 565, in one embodiment, can also perform clock domain isolation, to prevent clock skew between the domains. If a clock skew is detected, link barrier 565 can block the domains from communicating until the clocks in each affected domain are reset.

It is particularly noted that, in one embodiment, fatal error register 392, when showing an error status indicator bit 391, can be cleared by either a complete re-boot of the entire network 100 or by the logical-NOR of LinkInUse register 359, such that any commands to clear the error status indicator bit will be ignored until all the bits of LinkInUse register 359 equal zero. Subsequent to clearing LinkInUse register 359 such that all bits in LinkInUse register 359 equal zero, error status indicator bit 391 can be cleared, such that fatal error register 392 shows error status indicator bit 390, indicating a clear and non-error condition, thus re-enabling communication between domains, e.g., domains 101 and 102.

Referring to FIGS. 3A, 3B, and 4, it is appreciated that, in one embodiment, a set of commands/software instructions/hardware logic is/are present in a node, (in this example, node 160 of FIG. 1) to support setting and clearing LinkInUse register 359. These commands require accompanying data, where the data contains "1"s to be written (or set) in LinkInUse register 359 for the Set_LinkInUse command, and likewise, the data must contain the "1"s in the bit position corresponding to the bits in LinkInUse register 359 that are desired to be cleared. LinkInUse register 359 is readable, but will only be written to via the individual bit manipulation commands, (Set_LinkInUse and Clear_LinkInUse) with their associated data mask.

It is appreciated that, in one embodiment, LinkInUse register 359 is set and cleared using the Set_LinkInUse and Clear_LinkInUse commands. Because the register is read only, writes directly to LinkInUse register 359 will not have any effect. Both hard reset (reboot) and soft reset (control-alt-delete) will clear LinkInUse register 359. LinkInUse register 359 is not cleared by an FE (fatal error).

Still referring to FIGS. 3A, 3B, and FIG. 4, the Set_LinkInUse command is a CSR (control status register) write command where the data contains the ones to be written (or set) in LinkInUse register 359. Likewise, the Clear_LinkInUse command is a CSR write command where the data contains ones in the bit positions corresponding to the LinkInUse bits to clear. LinkInUse register 359 is readable, but is only written to via the Set_LinkInUse commands with their associated mask.

Referring now to FIG. 5, in a practical example of the operation of link barrier 565, domain 101 was communicating data to domain 102 over network 100, analogous to network 100 of FIG. 1. In this example, UDP is used to facilitate the communication. Prior to communication, link barrier 565 had received commands from nodes 150, 160, and 180 indicating that they were actively using or intended to utilize link 165 to communicate data (as shown in LinkInUse register 359 of FIG. 3B).

In this example, node 150 is making a flight (77) and seat reservation (3A) on an airline (Acme). Acme airline's database is located in node 160. The credit card company, to which the airplane ticket is being charged, has its database located in node 180.

During the transmission of the data, the packet of data was corrupted, and link interface 165, during a CRC (cyclic redundancy check), detected or observed an error in the data. The data could have been corrupted in the CPU, CPU cache, or anywhere in the network. By having detected an error in the data packet, there is data that is potentially corrupt, which if allowed to propagate within the network, can cause problems such as events out of order, double booking of the Acme flight, charging a customer for a flight not reserved.

The error detection caused fatal error register 392 of FIG. 4 to change from error status indicator bit 390 (no error) to error status indicator bit 391 (error). As described in FIG. 4, when fatal error register 392 has an error status indicator bit 391, link barrier 565 is activated, preventing further communication between domain 101 and domain 102.

Because link barrier 565 is activated, nodes 150, 160, and 180 are unable to communicate. Therefore, node 150 will not be able to receive an acknowledgment signal from node 160 that the reservation was received. Further, the credit card company will not be able to confirm the charge to the account. Additionally, other requests from node 150 or other domains to reserve that same flight and seat will not be able to view that information regarding the Acme flight. Activating link barrier 565 upon error detection provides error protection such that the corrupted data will not be consumed by the receiving system. Additionally, link barrier 565 further provides protection against error propagation such that because the corrupted data was not consumed, subsequent decisions based upon that corrupted data is prevented.

Each node resolves the detected error in an individual manner. For example, node 150 may re-boot. Node 160 may deny access to the database, and node 180 may flush its cache to remove the debit to the credit card account. Once each node has resolved the data error, communication between the nodes needs to be re-established.

To re-establish communication (deactivating link barrier 565) between nodes 150 160, and 180, fatal error register 392 needs to have its error status indicator bit reset from indicator bit 391 to indicator bit 390. As described in FIGS. 3B and 4, each of the nodes that had indicated to link barrier 565 that they intended to utilized link 165 to communicate data (FIG. 3B) needs to reset their associated bit position in LinkInUse register 359 to zero. A data mask is used each node to facilitate each nodes resetting of its associated bit position. Subsequent to LinkInUse register having all its bit positions reset to zero, this resets fatal error register 392 to error status indicator bit 390, and communication is re-established.

It is further appreciated that link barrier 565 will qualify the clearing of the fatal error bit in its error register 392 (CSR_Status[0]) by the logical-NOR of LinkInUse register 359, such that the Clr_FE CSR command will not actually clear the error bit, e.g., error status indicator bit 391 of FIG. 4, until LinkInUse=0.

Exemplary Electronic System

FIG. 6 is a block diagram of an exemplary computer system 650 which can be implemented in a network, e.g., network 100. In one embodiment, computer system 650 is an individual computer system. In another embodiment, computer system 650 can represent multiple computer systems. In yet another embodiment, multiple instances of computer system 650 may implemented within one backplane, e.g. a SuperDome System.

With reference to FIG. 6, portions of the present invention are comprised of computer-readable and computer executable instructions which reside, for example, in computer-readable media of an electronic system such as a computer system. FIG. 6 illustrates an exemplary electronic device 650 upon which embodiments of the present invention may be practiced. It should be appreciated that computer system 650 of FIG. 6 is an exemplary representation of a number of different computer systems and electronic devices, including but not limited to desktop computers, laptop computers, handheld computers, cell phones, pagers, etc.

Computer system 650 includes an address/data bus 609 for communicating information, a processor 601 coupled with bus 609 for processing information and instructions, a non-volatile memory (ROM—read only memory) 602 coupled with bus 609 for storing static information and instructions for processor 601, and a volatile memory (RAM—random access memory) 603 coupled with bus 609 for storing information and instructions for the processor 601. It is appreciated that, in one embodiment, exemplary computer system 650 may be configured with multiple processors 601. Computer system 650 also includes data storage device 604 such as a magnetic or optical disk and disk drive coupled with bus 609 for storing information and instructions. Data storage device 604 can include one or more removable magnetic or optical storage media, e.g., diskettes, tapes, SD (secure digital) cards, MMC (multi-media cards), which are computer readable memories. Memory units of electronic device 650 include volatile memory 603, non-volatile memory 602, and data storage device 604.

Computer system 650 of FIG. 6 can further include an optional signal generating device 608, e.g., a wired or wireless network interface card (NIC) coupled with bus 609 for interfacing with other computer systems and/or other electronic devices. Computer system 650 can also include an optional alphanumeric input device 606 which includes alphanumeric and function keys coupled with bus 609 for communicating information and command selections to processor 601. An optional display device 605 can be coupled with bus 609 for displaying information to a computer user. Display device 605 may be a liquid crystal display (LCD), a cathode ray tube (CRT), a flat panel display such as an FED (field emission display), an electronic paper display, or nearly any other display device suitable for creating and generating graphic images and alphanumeric characters recognizable to a user.

Computer system 650 also includes an optional cursor control or directing device 607 coupled with bus 609 for communicating user input information and command selections to processor 601. Cursor control device 607 allows the user to dynamically signal the two dimensional movement of a visible symbol (cursor) on a display screen of display device 605. Many implementations of cursor control device 607 are known in the art, including but not limited to, a trackball, mouse, optical mouse, touch pad, touch screen, joystick, or special keys on alphanumeric input device 606 capable of signaling movement of a given direction or manner of displacement. Alternatively, it is appreciated that a cursor can be directed and/or activated via input from alphanumeric input device 606 using special keys and/or key sequence commands.

Figure 7:
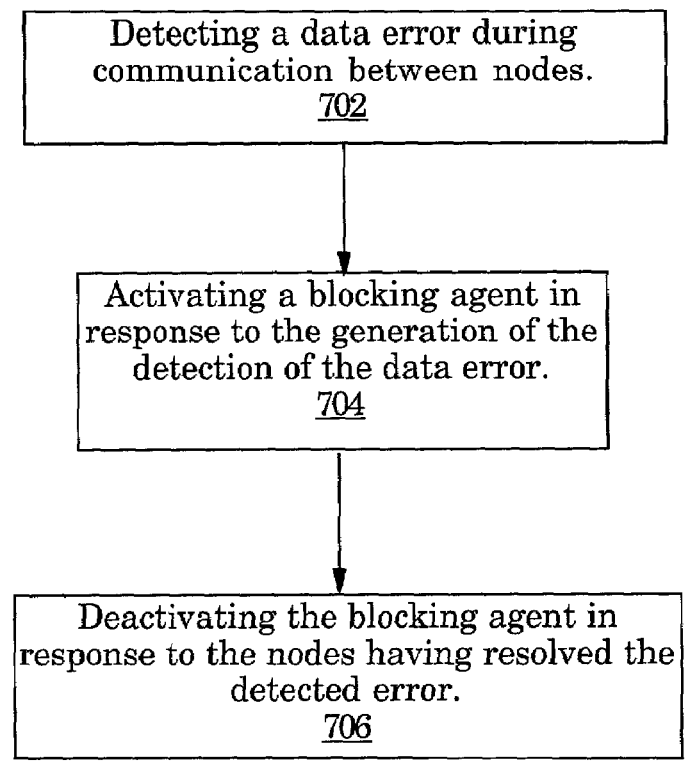
FIG. 7 is a flowchart describing the steps in a process of error containment, in accordance with one embodiment of the present invention.

FIG. 7 is a flowchart 700 of steps performed in accordance with one embodiment of the present invention for providing error protection to protection domains in a network environment. Flowchart 700 includes processes of the present invention which, in one embodiment, are carried out by processors and electrical components under the control of computer readable and computer executable instructions. The computer readable and computer executable instructions reside, for example, data storage features such as software instructions 350 of FIG. 2. However, the computer readable and computer executable instructions may reside in any type of computer readable medium. Although specific steps are disclosed in flowchart 700, such steps are exemplary. That is, the present invention is well suited to performing various other steps or variations of the steps recited in FIG. 7. Within the present embodiment, it should be appreciated that the steps of flowchart 700 may be performed by software, by hardware or by any combination of software and hardware.

In step 702 of FIG. 7, a data error is detected during communication between nodes (e.g., nodes 150 and 160) separated by a link (e.g., link 165 of FIG. 5) in a network (e.g., network 100 of FIG. 5). Numerous methods are employable to detect data errors. In one embodiment, a CRC (cyclic redundancy check) process is used to detect errors in data.

In step 704 of FIG. 7, a blocking agent is activated, in one embodiment. In one embodiment, an error bit is generated in response to the detection of the error. In one embodiment, the error bit is generated by a link, such as link 165 of FIG. 5, and indicates that an error has been detected or observed. The error bit is stored in an error register, e.g., fatal error register 392 of FIG. 4. In one embodiment, the blocking agent is a link barrier, e.g., link barrier 565 of FIG. 5. The activation of link barrier 565 disables further communication between the communicating nodes, and thus prevents further propagation of the data error within network 100 of FIGS. 1 and 5.

Still in step 704 of FIG. 7, the data error is resolved. It is appreciated that each of the nodes may resolve the error independently of the other nodes. It is further appreciated that each of the nodes will resolve the error in a manner appropriate for that particular node and for the type of error detected. For example, in one embodiment, node 150 may be required to re-boot, whereas node 160 may determine that the most appropriate action for the resolving of the data error is to flush its cache, and whereas node 180 may simply block further access to the corrupted data.

Still in step 704 of FIG. 7, multiple clearing bits are generated to clear the error bit. In one embodiment, each of the communicating nodes, e.g., nodes 150, 160 and 180, generates a clearing bit. The number of clearing bits are equal to the number of nodes that are communicating. The clearing bit generated by each of the nodes corresponds to a bit position in a register, e.g., LinkInUse register 359 of FIG. 3B. The clearing bit resets the usage bit set prior to communication, e.g., LinkInUse register 359 of FIG. 3A. The usage bit indicated which nodes will be or are anticipating using a link, e.g., link 165 to facilitate communication. It is appreciated that, in one embodiment, all of the usage bits in register 359 need to be cleared before the error bit can be reset.

In step 706 of FIG. 7, once the clearing bits are generated and the error bit has been reset to error status indicator bit 390, the blocking agent, e.g., link barrier 565 of FIG. 5, is deactivated, thus re-enabling communication between the communicating nodes.

A computer-usable medium having computer-readable program code embodied therein for causing a computer system to perform a method of error protection.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of error protection comprising:
    detecting an error during communication between nodes in a network, said nodes separated by a link;
    blocking further communication between said nodes in response to said detected error;
    unblocking said blocked communication between said nodes, provided said communicating nodes have resolved said detected error, wherein said communication between said nodes is re-enabled; and
    setting a link usage indicator in a first storage element by reach of said communicating nodes prior to communication therebetween, and wherein each of said communicating nodes has a corresponding position in said first storage element, and wherein said link usage indicator set by each of said nodes is relative to said corresponding position in said first storage element,
    wherein said resolved said detected error comprises generating a clearing bit from each of said communicating nodes, wherein said clearing bit clears a bit in said corresponding position.

2. The method as recited in claim 1 wherein said detection of said error causes a generation of an error indicator, said error indicator stored in a second storage element.

3. The method as recited in claim 2 further comprises activating a blocking agent to provide said blocking of said communication, said blocking agent activated in response to said generation of said error indicator.

4. The method as recited in claim 1 wherein said resolving of said detected error is performed by each of said communicating nodes, and is in a manner appropriate for each node.

5. The method as recited in claim 1 further comprises generating multiple clearing indicators by said nodes, wherein each of said nodes generates one of said multiple clearing indicators subsequent to its said resolving of said error, wherein each of said clearing indicators corresponds to an associated corresponding position relative to said nodes, and wherein each of said clearing indicators resets a link usage indicator set by each of said nodes.

6. The method as recited in claim 1 wherein said first storage element and a second storage element are disposed in said link.

7. The method as recited in claim 1 wherein said first storage element and a second storage element are disposed in each of said nodes.

8. A computer-usable medium having computer-readable program code embodied therein for causing a computer system to perform a method of error protection comprising:
    detecting an error during communication between nodes in a network, said nodes separated by a link;
    blocking further communication between said nodes in response to said detected error;
    unblocking said blocked communication between said nodes, provided said communicating nodes have resolved said detected error, wherein said communication between said nodes is re-enabled; and
    setting a link usage indicator in a first storage element by reach of said communicating nodes prior to communication therebetween, and wherein each of said communicating nodes has a corresponding position in said first storage element, and wherein said link usage indicator set by each of said nodes is relative to said corresponding position in said first storage element, wherein said resolved said detected error comprises generating a clearing bit from each of said communicating nodes, wherein said clearing bit clears a bit in said corresponding position.

9. The computer-usable medium of claim 8 wherein said detection of said error causes a generation of an error indicator, said error indicator stored in a second storage element.

10. The computer-usable medium of claim 9 wherein said method of error protection further comprises activating a blocking agent to provide said blocking of said communication, said blocking agent activated in response to said generation of said error indicator.

11. The computer-usable medium of claim 8 wherein said resolving of said detected error is performed by each of said communicating nodes, and is in a manner appropriate for each node.

12. The computer-usable medium of claim 8 wherein said method of error protection further comprises generating multiple clearing indicators by said nodes, wherein each of said nodes generates one of said multiple clearing indicators subsequent to its said resolving of said error, wherein each of said clearing indicators corresponds to an associated corresponding position relative to said nodes, and wherein each of said clearing indicators resets a link usage indicator set by each of said nodes.

13. The computer-usable medium of claim 8 wherein said first storage element and a second storage element are disposed in said link.

14. The computer-usable medium of claim 8 wherein said first storage element and a second storage element are disposed in each of said nodes.

15. A computer system in a computer system network, said computer system comprising:
   a communication interconnect;
   an optional display device coupled to said communication interconnection;
   a memory unit coupled to said communication interconnect; and
   a processor coupled to said communication interconnect, said processor for executing a method of error protection comprising:
   detecting an error during communication between nodes in a network, said nodes separated by a link;
   blocking further communication between said nodes in response to said detected error;
   unblocking said blocked communication between said nodes, provided said communicating nodes have resolved said detected error, wherein said communication between said nodes is re-enabled; and
   setting a link usage indicator in a first storage element by reach of said communicating nodes prior to communication therebetween, and wherein each of said communicating nodes has a corresponding position in said first storage element, and wherein said link usage indicator set by each of said nodes is relative to said corresponding position in said first storage element,
   wherein said resolved said detected error comprises generating a clearing bit from each of said communicating nodes, wherein said clearing bit clears a bit in said corresponding position.

16. The computer system of claim 15 wherein said detection of said error causes a generation of an error indicator, said error indicator stored in a second storage element.

17. The computer system of claim 16 wherein said method of error protection further comprises activating a blocking agent to provide said blocking of said communication, said blocking agent activated in response to said generation of said error indicator.

18. The computer system of claim 15 wherein said resolving of said detected error is performed by each of said communicating nodes, and is in a manner appropriate for each node.

19. The computer system of claim 15 wherein said method of error protection further comprises generating multiple clearing indicators by said nodes, wherein each of said nodes generates one of said multiple clearing indicators subsequent to its said resolving of said error, wherein each of said clearing indicators corresponds to an associated corresponding position relative to said nodes, and wherein each of said clearing indicators resets a link usage indicator set by each of said nodes.

20. The computer system of claim 17 wherein said first storage element and a second storage element are disposed in said link.

21. The computer system of claim 18 wherein said first storage element and a second storage element are disposed in each of said nodes.

* * * * *

UNITED STATES PATENT AND TRADEMARK OFFICE
CERTIFICATE OF CORRECTION

PATENT NO. : 7,447,146 B2  Page 1 of 1
APPLICATION NO. : 10/028298
DATED : November 4, 2008
INVENTOR(S) : David N. Goldberg et al.

It is certified that error appears in the above-identified patent and that said Letters Patent is hereby corrected as shown below:

In column 12, line 35, in Claim 4, after "nodes" delete ",".

In column 12, line 49, in Claim 7, delete "nodes" and insert -- link --, therefor.

In column 13, line 15, in Claim 11, after "nodes" delete ",".

In column 13, line 31, in Claim 14, delete "nodes" and insert -- link --, therefor.

In column 14, line 26, in Claim 18, delete "detected" before "error".

In column 14, line 43, in Claim 21, delete "nodes" and insert -- link --, therefor.

Signed and Sealed this

Ninth Day of June, 2009

JOHN DOLL
*Acting Director of the United States Patent and Trademark Office*